United States Patent [19]

Yanagishita et al.

[11] Patent Number: 5,017,115
[45] Date of Patent: May 21, 1991

[54] MOLD ASSEMBLY FOR MOLDING FRAME-INSTALLED AND SKIN-COVERED SEAT CUSHION STRUCTURE

[75] Inventors: Norio Yanagishita; Ichiro Matsuura; Kiichiro Ishimaru; Mikio Akai, all of Kanagawa, Japan

[73] Assignee: Ikeda Bussan Co., Ltd., Ayase City, Japan

[21] Appl. No.: 517,546

[22] Filed: Apr. 27, 1990

Related U.S. Application Data

[63] Continuation of Ser. No. 283,851, Dec. 13, 1988, abandoned.

[30] Foreign Application Priority Data

Mar. 30, 1988 [JP]  Japan .................................. 63-41196

[51] Int. Cl.⁵ ..................... B29C 39/10; B29C 39/22
[52] U.S. Cl. ..................... 425/125; 249/93; 249/94; 264/46.4; 264/46.7; 425/DIG. 29; 425/DIG. 48
[58] Field of Search ..................... 264/46.5, 46.6, 46.7, 264/46.8, 46.4; 425/121, 123, 124, 125, 117, DIG. 29, DIG. 48, 4 R, 817 R, 388; 249/91, 93, 94, 95, 205, 219.1

[56] References Cited

U.S. PATENT DOCUMENTS

| | | | |
|---|---|---|---|
| 2,039,105 | 4/1936 | Naery | 425/DIG.29 |
| 2,102,717 | 12/1937 | Jennings | 249/219.1 |
| 2,802,766 | 8/1957 | Leverenz | 264/46.4 |
| 3,078,516 | 2/1963 | Trammell, Jr. et al. | 425/DIG. 48 |
| 3,466,706 | 9/1969 | Kazuo | 425/DIG. 48 |
| 4,097,035 | 6/1978 | Shuman | 425/DIG. 48 |
| 4,115,170 | 9/1978 | Sanson | 156/79 |
| 4,116,736 | 9/1978 | Sanson et al. | 425/388 |
| 4,397,798 | 8/1983 | Parten | 264/46.5 |
| 4,419,307 | 12/1983 | Kohara et al. | 284/46.5 |
| 4,465,710 | 8/1984 | Uchiyama et al. | 264/46.5 |
| 4,501,541 | 2/1985 | Bethell et al. | 425/117 |
| 4,525,130 | 6/1985 | Netznik | 425/DIG. 29 |

FOREIGN PATENT DOCUMENTS

| | | |
|---|---|---|
| 177199 | 4/1986 | European Pat. Off. . |
| 3614481 | 11/1987 | Fed. Rep. of Germany . |
| 51-27259 | 8/1976 | Japan ......................... 425/DIG. 48 |
| 554628 | 7/1943 | United Kingdom . |
| 768433 | 2/1957 | United Kingdom . |
| 1156528 | 6/1969 | United Kingdom . |
| 1355378 | 6/1974 | United Kingdom . |
| 83/00457 | 2/1983 | World Int. Prop. O. . |
| 88/02049 | 3/1988 | World Int. Prop. O. . |

Primary Examiner—Jay H. Woo
Assistant Examiner—Khanh P. Nguyen
Attorney, Agent, or Firm—Foley & Lardner

[57] ABSTRACT

Herein disclosed is a mold assembly for molding a frame-installed and skin-covered seat cushion structure, which includes a mold having a cavity formed therein; a retainer jig adapted to be put on the mold, the retainer jig being equipped with clamps for clamping a frame of the seat cushion structure to be produced; a lid adapted to be put on the mold with an interposal of the retainer jig therebetween; and a sealing element for achieving a sealing between the mold and the lid upon proper putting of the lid on the mold.

6 Claims, 2 Drawing Sheets

MOLD ASSEMBLY FOR MOLDING FRAME-INSTALLED AND SKIN-COVERED SEAT CUSHION STRUCTURE

This application is a continuation of application Ser. No. 07/283,851, filed Dec. 13, 1988, now abandoned.

BACKGROUND OF THE INVENTION

1. Field of the Invention

The present invention relates in general to a mold assembly, and more particularly to a mold assembly for molding a frame-installed and skin-covered seat cushion structure.

2. Description of the Prior Art

In order to produce a cushion structure for automotive seats, there has been hitherto used a molding technique which comprises putting a bag-shaped outer skin member into a cavity of a mold, putting a lid on the mold to close the cavity, pouring a foamable plastic material into the cavity (more specifically, into the skin member) and curing the material. With this, a so-called "skin-covered cushion pad" is produced Then, the pad is fixed to a seat frame by a manual labour for assembly of the seat cushion structure.

However, the step of fixing the pad to the frame is troublesome and thus requires a great deal of skill.

SUMMARY OF THE INVENTION

It is therefore an object of the present invention to provide a mold assembly by which molding of a seat cushion structure is quite simplified.

According to the present invention, there is provided a mold assembly for molding a frame-installed and skin-covered seat cushion structure. The mold assembly comprises a mold having a cavity formed therein; a retainer jig adapted to be put on the mold, the retainer jig being equipped with clamps for clamping a frame of the seat cushion structure to be produced; a lid adapted to be put on the mold with an interposal of the retainer jig therebetween; and sealing means for achieving a sealing between the mold and the lid upon proper putting of the lid on the mold.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
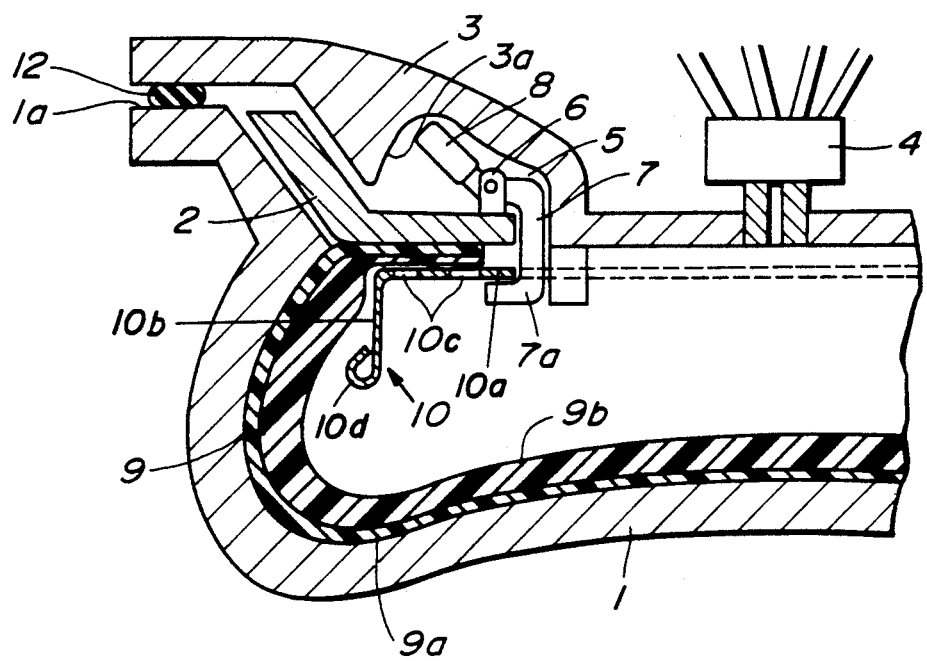
FIG. 1 is a sectional, but half, view of a mold assembly according to the present invention.
Figure 2:
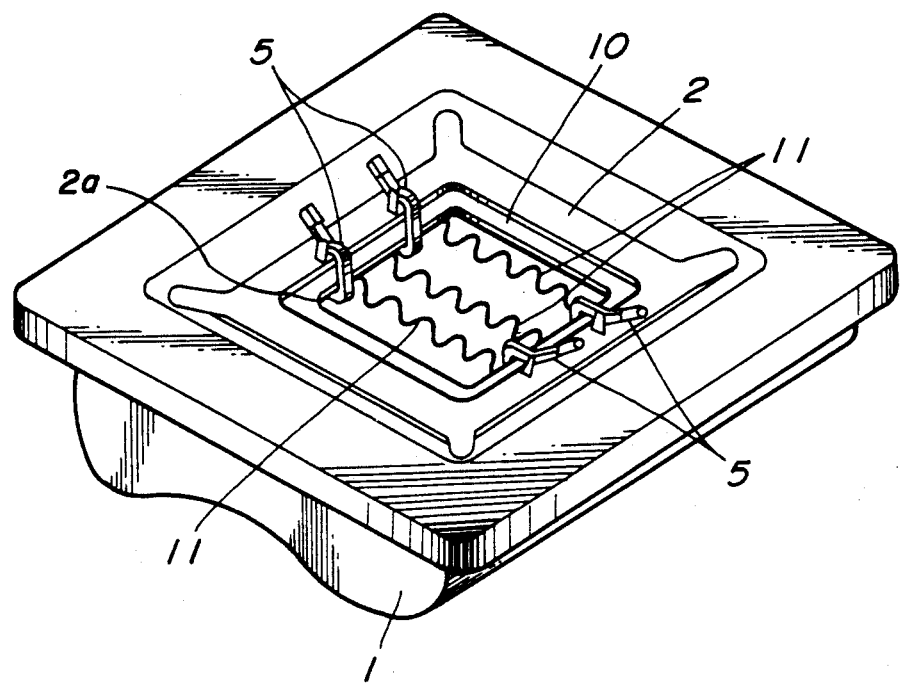
FIG. 2 is a perspective view of the mold assembly with a lid removed.

Referring to FIGS. 1 and 2, particularly FIG. 1, there is shown a mold assembly according to the present invention.

In the drawings, denoted by numeral 1 is a mold 1 which has a cavity formed therein. The cavity is shaped to match with the contour of a seat cushion structure which is to be produced. Denoted by numeral 2 is a rectangular frame like retainer jig with an aperture 2a which is adapted to be put on a mouth portion of the mold 1 with the, aperture 2a exposed to the mold as is seen from FIG. 2. Denoted by numeral 3 is a lid which is adapted to be put on the mold 1 to close the cavity of the mold 1. For achieving a hermetical sealing between the mold 1 and the lid 3, there is arranged a rubber packing 12 on a flange top 1a of the mold 1. The lid 3 has a material feeding head 4 integrally connected thereto. For the purpose which will become apparent hereinafter, the lid 3 is formed with recesses 3a at a back side thereof.

As is seen from FIG. 2, the rectangular retainer jig 2 is equipped with a plurality of clamps 5. In the illustrated embodiment, four clamps 5 are employed which are arranged on laterally opposed sides of the retainer jig 2 two by two. Upon assembly of the mold assembly, the clamps 5 are neatly received in the recesses 3a of the lid 3 as is understood from FIG. 1.

As is seen from FIG. 1, each clamp 5 comprises a bracket 6 connected to the jig 2, a lever 7 pivotally connected to the bracket 6 and a handle 8 fixed to a head of the lever 7. The lever 7 has a lower part 7a shaped like a jaw. That is, when the clamp 5 is in its operative condition as shown in FIG. 1, the jaw part 7a of the lever 7 projects through the aperture 2a of the jig 2 is exposed to a back side of the retainer jig 2 clamping a frame 10 and defining a certain clearance between the frame 10 and the jaw part 7a and the retainer jig 2.

In the following, the steps for producing a seat cushion structure by using the mold assembly will be described.

Prior to carrying out the steps, the rectangular frame 10 and a bag-shaped outer skin member 9 are prepared.

The frame 10 has a generally L-shaped cross section and thus comprises a rectangularly extending base portion 10a and a side wall portion 10b which extends along the outer periphery of the base portion 10a. The base portion 10a is formed with a plurality of openings 10c, while, the side wall portion 10b is formed with a curled edge 10d. As will be understood from FIG. 2, a plurality of spring wires 11 expand between opposed sides of the rectangular frame 10.

The bag-shaped outer skin member 9 comprises an outer skin 9a, such as fabric, synthetic sheet or the like, and a wadding 9b, such as foamed urethane lamina or the like, which is lined on a back surface of the outer skin 9a.

First, the outer skin member 9 and the frame 10 are attached to the back side of the retainer jig 2 by means of the clamps 5 projecting through the aperture 2a of the jig 2. Under this clamped condition, the peripheral mouth portion of the bag-shaped outer skin member 9 is sandwiched between the base portion 10a of the frame 10 and the back surface of the retainer jig 2, as is seen from FIG. 1.

Then the retainer jig 2 is properly put on the mold 1 having the outer skin member 9 neatly received into the cavity of the mold 1. Then, if necessary, the outer skin member 9 is handled by an operator's hand or hands from the back side to match the shape of the skin member 9 with that of the cavity of the mold 1.

Then, the lid 3 is properly put on the mold 1 to close the cavity of the mold 1. Although not shown in the drawings, a suitable clamp device is used for fastening the lid 3 to the mold 1.

Then, a foamable plastic material, such as a material for foamed polyurethane, is poured into the cavity of the mold 1 through the material feeding head 4. The material in the cavity is cured for a given time. During this curing, a part of the material penetrates the wadding 9b of the outer skin member 9. Due to provision of the openings 10c of the frame 10, the material can penetrate the peripheral mouth portion of the outer skin member 9.

When the material is cured sufficiently and thus hardened to a certain level, the lid 3 is removed from the mold 1 and then the retainer jig 2 is removed from the mold 1 together with a product, viz., a frame-installed and skin-covered seat cushion structure. Then, the product is released from the retainer jig 3 by manipulating the clamps 5.

Figure 3:
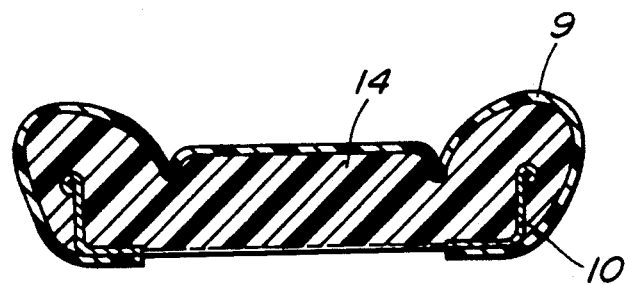
FIG. 3 is a sectional view of a seat cushion structure produced through the mold assembly of the invention.

As is seen from FIG. 3, the seat cushion structure thus produced comprises the foamed pad 14, the outer skin member 9 and the frame 10 which are combined integrally.

In the following, advantages of the present invention will be described.

Since the fixing of the frame 10 to the pad 14 is accomplished at the same time when the foamable material in the cavity of the mold 1 is cured, the production of the seat cushion structure is simplified as compared with the afore-mentioned conventional case.

Since the retainer jig 2 is employed, the mouth portion of the bag-shaped outer skin member 9 is assuredly held during curing of the material in the cavity. Since the curing carries foaming, the tight holding of the outer skin member 9 is very important.

Because of provision of the openings 10c of the frame 10, the foamable material can penetrate the wadding 9b of the mouth portion of the bag-shaped outer skin member 9. Thus, upon completion of molding, the mouth portion of the outer skin member 9 is tightly connected to the pad 14 through the hardened material placed in the openings 10c.

What is claimed is:

1. A mold assembly for molding a frame-installed and skin-covered seat cushion structure, which comprises:
   a mold having a cavity formed therein;
   a frame like retainer jig capable of being put on said mold having an aperture exposed to the cavity of the mold;
   clamps held by said retainer jig for clamping a frame inside said seat cushion and sandwiching peripheral portions of a skin member of the seat cushion structure which is to be produced between said retainer jig and said frame, each clamp including a bracket connected to said retainer jig, a lever pivotally connected to said bracket and having a jaw-like leading end portion which is projectable into said cavity through said aperture to clamp said frame and sandwiching said peripheral portions of the skin member between said frame and said retainer jig, and a handle fixed to a head of said lever to be manually handled;
   a lid capable of being put on said mold for closing said cavity of said mold and said aperture of said retainer jig interposed therebetween, said lid having recesses for neatly receiving therein said bracket, said handle and an upper part of said lever of said clamps when the lid is properly put on said mold; and
   sealing means for achieving a sealing between said mold and said lid upon proper putting of said lid on said mold.

2. A mold assembly as claimed in claim 1, in which the jaw part of said lever is exposed to a back side of said retainer jig clamping said frame and defining a certain clearance between the frame clamped by said jaw part and said retainer jig when said clamp assumes its operative position.

3. A mold assembly as claimed in claim 2, in which said mold is formed with a flange on which said sealing means is mounted.

4. A mold assembly as claimed in claim 3, in which said sealing means is a rubber packing.

5. A mold assembly as claimed in claim 4, in which said lid has a material feeding head integrally connected thereto.

6. A mold assembly as claimed in claim 2, wherein said frame includes an opening defined by a base portion, said base portion comprises an upper and a bottom side formed with a plurality of openings, and said peripheral portions of said skin member is sandwiched between said bottom side of said frame and said backside of said retainer by pressing a lower part of said leading end portion of said clamp on said bottom side of said frame.

* * * * *